United States Patent [19]

Moss

[11] Patent Number: 4,818,048
[45] Date of Patent: Apr. 4, 1989

[54] HOLOGRAPHIC HEAD-UP CONTROL PANEL

[75] Inventor: Gaylord E. Moss, Marina del Rey, Calif.

[73] Assignee: Hughes Aircraft Company, Los Angeles, Calif.

[21] Appl. No.: 788

[22] Filed: Jan. 6, 1987

[51] Int. Cl.[4] .............................................. G03H 1/00
[52] U.S. Cl. ...................................... 350/3.7; 350/174
[58] Field of Search ................ 350/174, 3.6, 3.7, 3.77, 350/3.83–3.85

[56] References Cited

U.S. PATENT DOCUMENTS 3,848,974 11/1974 Hosking et al. ...................... 350/174

FOREIGN PATENT DOCUMENTS 191847 9/1985 Japan .

Primary Examiner—Bruce Y. Arnold
Attorney, Agent, or Firm—Leonard A. Alkov; A. W. Karambelas

[57] ABSTRACT

A head-up holographic display for providing a display on a vehicle windshield of a control panel and indications of the vehicle operator's manual movements and manual selection operations on the control panel. The display includes a number of edge-illuminatable hologram layers providing a background display and touch and activation indications. Signals from the control panel selectively illuminate respective layers and portions thereof in response to operations on the control panel to create a windshield display thereof. In a second embodiment, a head-up virtual image background display is provided by a first hologram and dots indicative of the driver's finger position on the control panel are positioned on the background display by selective illumination of a second hologram.

13 Claims, 4 Drawing Sheets

HOLOGRAPHIC HEAD-UP CONTROL PANEL

BACKGROUND OF THE INVENTION

1. Field of the Invention

The subject invention relates generally to displays and more particularly to a head-up control panel display.

2. Display of Related Art

Current approaches to automobile control panels involve the use of a CRT touchscreen for display of control panels for cars. Because such a touchscreen has no tactile feedback, the operator must look carefully at the screen to operate the proper controls.

In some such systems the control means is too complex to allow selection from the menu while driving the vehicle. Therefore, such touchscreens are necessarily limited to the presentation of only a few functions that can be selected by a quick glance at the screen.

Holographic head-up displays are also known in the prior art, particularly for high performance aircraft applications. See generally U.S. Pat. Nos. 3,885,095 and 4,447,128 assigned to Hughes Aircraft Company.

SUMMARY OF THE INVENTION

The purpose of the subject invention is to allow an operator such as a pilot or driver to look at a complex control panel on a head-up display and to see his own inputs on that panel, as relayed from a tactile or other sensor on the panel. The invention eliminates the necessity to look away from the outside view in order to operate the control panel.

The invention facilitates inputs to a complex control panel without the need for looking down at the panel by providing a head-up display which shows where the operator's hand is on the control panel. The panel face can be switchable to provide separate configurations for various functions. One preferred embodiment provides touch and activation indications using an edge illuminated holographic display while a second preferred embodiment provides virtual image touch indications on a virtual image head-up control panel using first and second transmission holograms.

The invention remedies a severe weakness in the current approach which uses a CRT touchscreen for display and control panels for cars. The invention should reduce the cost of controls in automobiles by allowing the use of a single programmable control panel for almost all functions without the loss of tactile feedback or the necessity to look away from the outside view. The same advantages apply for aircraft and other vehicle displays.

DESCRIPTION OF THE PREFERRED EMBODIMENTS

The following description is provided to enable any person skilled in the optical and automotive fields to make and use the invention, and sets forth the best modes contemplated by the inventor of carrying out his invention. Various modifications, however, will remain readily apparent to those skilled in the art since the generic principles of the present invention have been defined herein specifically to provide a relatively economical and easily manufactured holographic head-up control panel.

Figure 1:
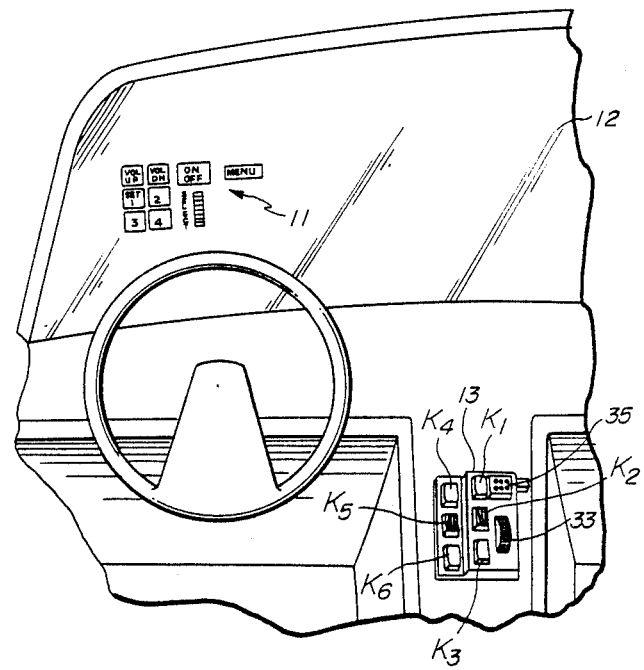
FIG. 1 is a schematic diagram illustrating a head-up display according to the preferred embodiment of the invention as used with touch sensitive control panel.

As shown in FIG. 1, the preferred embodiment includes a holographic head-up display 11 on a vehicle windshield 12. The head-up display 11 shows the face of a separate control panel 13. This panel 13 includes a thumbwheel 34, upper row keys $K_1$, $K_2$, $K_3$, and lower row keys $K_4$, $K_5$, $K_6$ and a bump pattern key 35.

According to the preferred embodiment, operations performed on the tactile control panel 13 are reflected on the head-up display 11. As will be discussed in more detail, the preferred embodiment is so constructed that the vehicle driver can detect his hand/finger position on the control panel 13 by observing the head-up display 11 such that the driver need not divert his attention from the view through the windshield.

Figure 2:
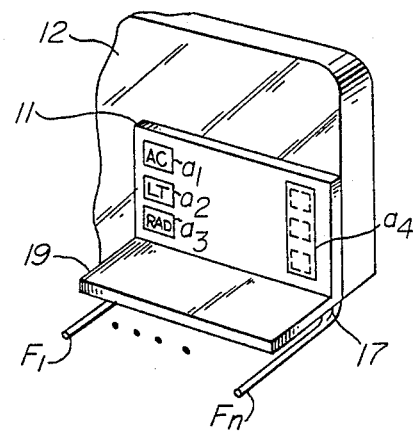
FIG. 2 is a perspective view of an edge illuminated head-up display according to the preferred embodiment.

As shown in FIG. 2, the display 11 comprises an edge-illuminated, multiple layer hologram affixed to the windshield 12. The bottom edge of the hologram 11 receives edge illumination through a number of tubular light conductors $F_1 \ldots F_n$. The light conductors $F_1 \ldots F_n$ may be, for example, fiber optical conductors.

The display of FIG. 2 is simplified for illustration purposes, however, it will be recognized by those skilled in the art that additional switches and functions may be displayed according to the principles illustrated.

In particular, the display of FIG. 2 is constructed to display whether or not three panel switches 31, 32, 33 are being touched and, if so, whether they are in an "on" or "off" condition. For example, the first panel switch 31 may indicate whether the air conditioner is on or off, the second panel switch 32 may indicate whether the vehicle lights are on or off, and the third switch 33 may indicate whether the vehicle radio is on or off. The display includes a master background $l_1$ (FIG. 3) consistently present which preferably provides illuminated display areas $a_1$, $a_2$, $a_3$ and suitable indicia, if desired, to give an indication of the identification of a switch 31, 32, 33 being touched. When a switch 31, 32, 33 is touched, a first indication, such as a selected color, appears over the appropriate display areas $a_1$, $a_2$, $a_3$. When the switch 31, 32, 33 is thereafter depressed to an "on" or "off" condition, a second indication, such as a selected different color, appears over the displayed switch identification. The first indication may be disabled when the second appears according to appropriate decoding logic to be discussed in more detail.

The display 11 also includes a background area $a_4$ identifying, for example, an air conditioner thumbwheel switch 34, such as may be used for temperature control. Obviously, thumbwheel switches may be used to vary numerous other parameters typically controlled by a vehicle operator and such indications may also, or alternatively, be displayed. According to the preferred embodiment, the position of the thumbwheel switch 34 is displayed over its background identification area by a series of bars 36, 37, 38. The bars 36, 37, 38 may be multiplied in number to comprise a substantially continuous position display, or as illustrated in FIG. 3, a low, medium and high position.

Figure 3:
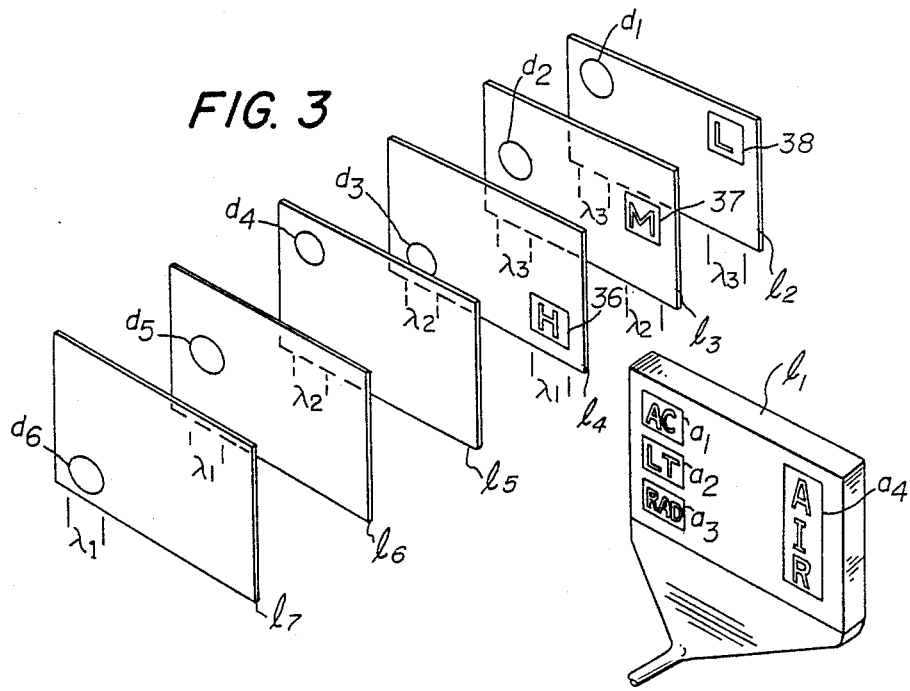
FIG. 3 is a perspective view of an edge illuminated holographic layer for generating a head-up display.

The particular structure of the hologram film layers $l_1 \ldots l_7$ for achieving the just described structure and operation is more particularly shown in FIG. 3. The first hologram layer $l_1$ contains a hologram for creating an air conditioning background identification area $a_1$, a light background identification area $a_2$, a radio background identification area $a_3$ and a thumbwheel switch background areas $a_4$.

The second hologram layer $l_2$ includes the holographic image of a "low" bar 38, which overlies the upper portion of the "AIR" thumbwheel position identification area $a_4$ and a circle or dot $d_1$ which is positioned to overlie the A.C. switch background identification $a_1$. The third hologram layer $l_3$ includes the holographic image of a "med" bar 37 which is positioned to overlie the "AIR" identification area $a_4$ and a circle or dot $d_2$ which is positioned to overlie the LT switch background identification area $a_2$. The fourth hologram image layer $l_7$ includes the holographic image of a "hi" bar 36 which is positioned to overlie the "AIR" background identification area $a_4$ and a circle or dot $d_3$ which is positioned to overlie the "Rad" background identification areas 33. The fifth, sixth and seventh layers $l_5$, $l_6$, $l_7$ include respective circles or dots $d_4$, $d_5$, $d_6$ which overlie the respective circles or dots $d_1$, $d_2$, $d_3$ of the second, third and fourth layers $l_2$, $l_3$, $l_4$. Each layer $l_1 \ldots l_7$ is provided with a suitable light conductor for edge illuminating the particular holograms in the layers $l_1 \ldots l_7$. As indicated, the illumination is provided by separate wavelengths, e.g., $\lambda_1$, $\lambda_2$, $\lambda_3$, such that adjacent layers $l_1 \ldots l_7$ are illuminated by light of different wavelengths to reduce crosstalk. While circles or dots are illustrated on layers $l_2 \ldots l_7$, suitable alphanumeric indicia can also be readily provided.

Figure 4:
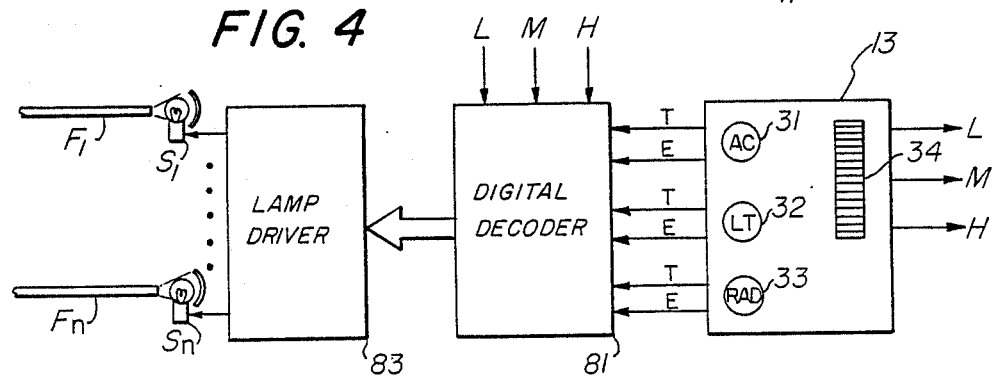
FIG. 4 is a schematic circuit diagram illustrating driver and decoder circuitry according to the preferred embodiment.

Apparatus for activating the display 11 is illustrated in FIG. 4. This apparatus includes the control panel 13, which outputs control signal T, E, L, M, H to a digital decoder 81. The decoder 81 receives the control signals T, E, L, M, H and responds to select which one or ones of a bank of source lights is activated. The source lights $S_1 \ldots S_n$ are selected by outputs of the decoder 81, which activates a lamp driver circuit for each lamp, shown collectively as a lamp driver 83 in FIG. 4. The detailed construction of decoder and driver circuitry 81, 83 is well-known in the art.

The control panel 13 includes touch sensitive switches 31, 32, 33. These switches 31, 32, 33 generate a first signal T when touched or depressed slightly and a second signal E when fully depressed. The signal E is a positive/negative or "on/off" signal. Such switching devices again are themselves well-known in the art. In addition, the control panel 13 provides the three signals L, M, H indicative of a low, medium or high position of the thumbwheel switch 34. Again, such signals may be developed with elementary circuitry, well-known in the art.

In general operation, touching of one of the switches 31, 32, 33 activates one of the selected source lights $S_1 \ldots S_n$. The selected one of the source lights $S_1 \ldots S_n$ provides edge illumination via one of the light conductors $F_1 \ldots F_n$ to a selected one of the touch indicating circles or dots $d_1 \ldots d_6$ in the appropriate hologram layer $l_2 \ldots l_7$. The viewer thus sees a touch indicator light up over the related background area $a_1$, $a_2$, $a_3$ on the windshield display 11 and therefore knows which key 31, 32, 33 he is touching. A selected one of the keys 31, 32, 33 may then be depressed to activate the associated function, in which case an E signal is generated which results in activation of the light source $S_1 \ldots S_n$ to display the appropriate one of the circles or dots $d_1 \ldots d_6$.

If the air conditioning key 31 is in the enabled (on or E) mode, movement of the thumbwheel switch 34 will result in activation of the appropriate L, M or H bar 36, 37, 38 in front of the "AIR" background $a_4$ on the display. This is a simple logic gating function provided in the digital decoder 81. Of course, more complex interactions and displays may readily be provided.

Figure 6:
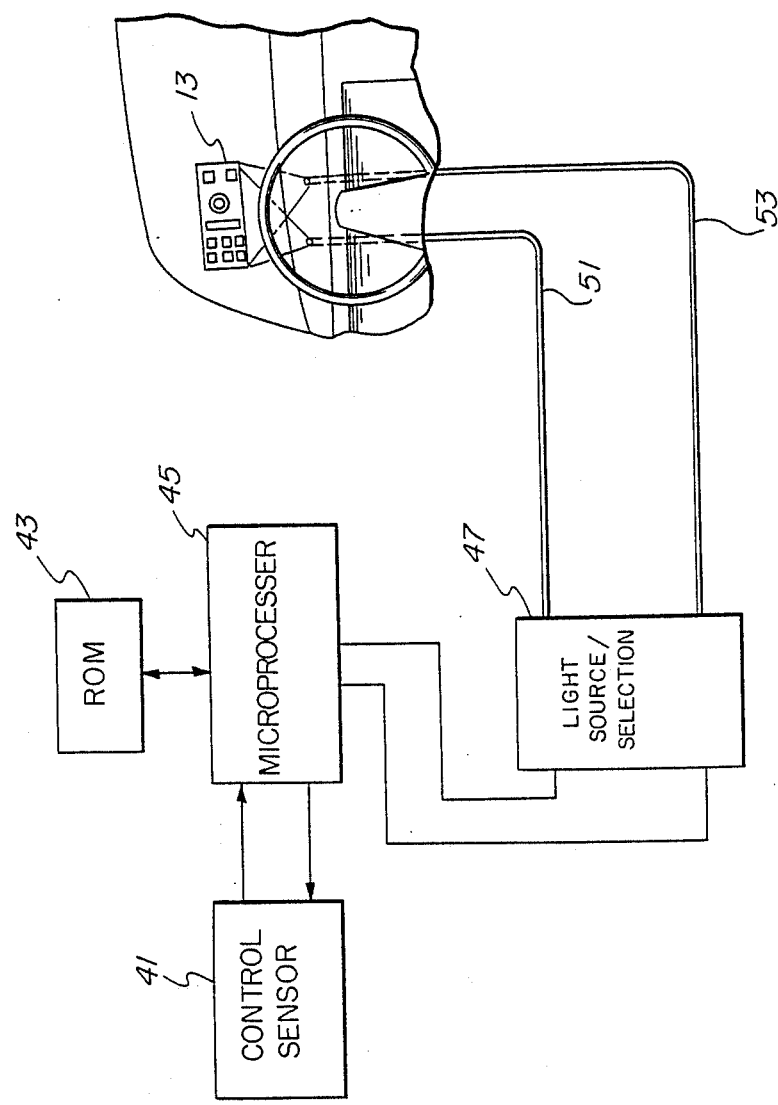
FIG. 6 is a schematic diagram of a microprocessor display control apparatus according to the preferred embodiment.

FIG. 6 illustrates one embodiment of a more complex display providing a menu selectable display and control function. According to this embodiment, the control panel 13 may be dedicated to one selected function or group of functions during one time interval and to another group of functions during a second time interval. The group of functions operable at any one time is controlled by a menu selection operation as is common in conventional microprocessors. A menu key 35 (FIG. 1) is thus provided according to this embodiment on the control panel 13 to select the group of functions which the control panel will control. A microprocessor 45 responds to the outputs of the control panel 13 to control the appropriate functions according to the menu selected and to generate the appropriate signals for controlling the display 11.

Accordingly in FIG. 6, a microprocessor 45 is shown receiving inputs of the control panel outputs from a control sensor 41. The microprocessor is controlled according to an appropriate program, e.g., in a ROM 43, to respond to the control panel inputs. The microprocessor 45 selects the appropriate light sources in light source/selection circuitry 47 to activate the display in the same general manner as in FIG. 4. The display structure is like that of FIG. 3 with the addition of additional background holograms, similar to $l_1$ in FIG. 3, to correspond to the "different" control panels selectable according to the menu. Of course, additional holograms such as $l_2$, etc., may be provided to generate additional display features required by the additional control panels.

Figure 5:
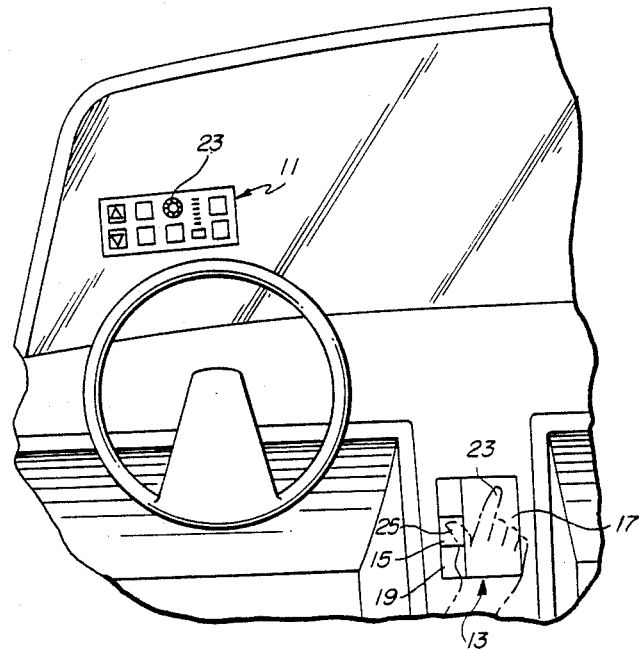
FIG. 5 is a perspective of an alternative control panel embodiment.

FIG. 5 illustrates an alternative control panel, which may be used in a microprocessor embodiment such as FIG. 6. This control panel 13 includes an activation switch 15, a sensing panel 17 and a mode change switch 19. One finger 23 selects a function, which is then put into operation by pressing an activation switch 15 by, e.g., the thumb 25. Using a touch sensitive panel, the operator views his finger movement over the panel 13, and depresses the mode change switch 35 to successively scroll to a desired function. The menu of functions is displayed on the head-up display 11 as scrolling occurs. When the desired function appears on the display 11, the operator presses the activation switch 15 to activate the display function. By selecting from a menu, all the functions on the display 11 can be changed to select from radio, to air conditioning, to telephone, or other functions.

To apply the display 11 to a windshield a substrate, such as mylar, is adhered to the surface of the window by a layer of optical cement. The substrate has deposited thereon the successive hologram film layers $l_1 \ldots l_7$. The holograms film layers $l_1 \ldots l_7$ can be formed of conventional film coatings, such as poly-N-vinyl carbazole or a dichromated gelatin, such as disclosed in known reference books, e.g., "Dischromated Gelatin For The Fabrication Of Holographic Optic Elements" by Chang et al., Applied Optics, Vol. 18, pgs. 2407–17 (1979). Finally, an abrasion resistant and moisture protection layer is deposited on the last hologram film layer $l_7$, such as a film of silicon dioxide or a silicon nitride.

Figure 7:
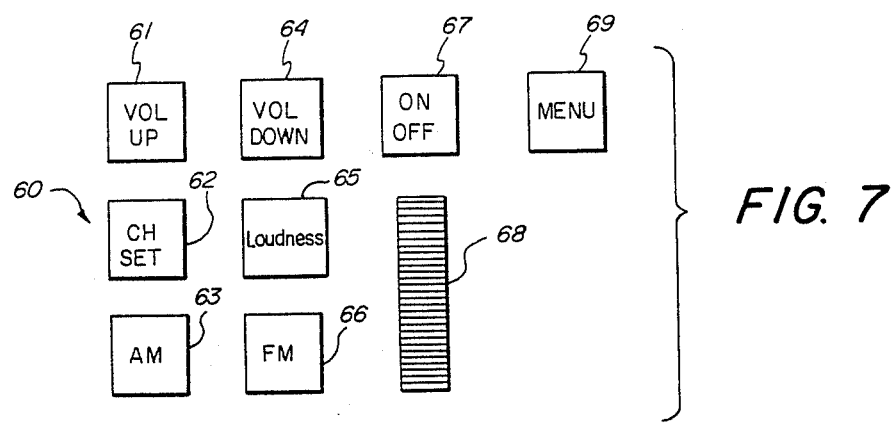
FIGS. 7 and 8 illustrate a keyboard assigned respective control functions according to a menu mode application of the preferred embodiment.
Figure 8:
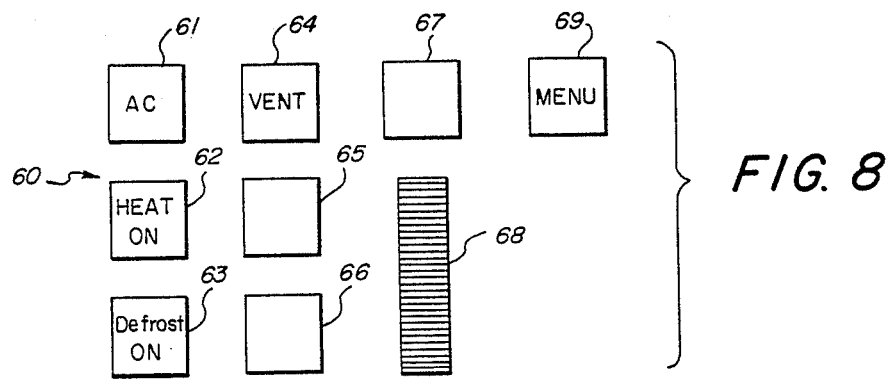

FIGS. 7 and 8 illustrate the application of a menu mode to a particular keyboard configuration 60. The keyboard includes eight keys 61, 62, 63, 64, 65, 66, 67, 69 and a thumbwheel switch 68. In FIG. 7, the key 67 turns the radio on or off and the keys 61 and 64 control volume, for example, by incremental adjustment through repeated activation. A thumbwheel switch 68 selects a particular channel, with the channel number being displayed, for example, by seven segment displays in the windshield level holographic display. A channel-set switch 62 permits setting of one or more channels into a permanent memory. AM, FM and loudness switches 62, 66, 65 are also provided. A separate menu function can be allocated as an audio equalizer function or a tone control key provided if desired.

A menu select key 69 is activated to allocate a new function to the keyboard 60. In FIG. 8, the keyboard has been allocated the function of internal climate control with switches 61, 62, 63 activating air conditioning, heat and defrost respectfully. The thumbwheel switch 68 provides heat level control in the various modes selected by the switches 61, 62, 63.

Figure 9:
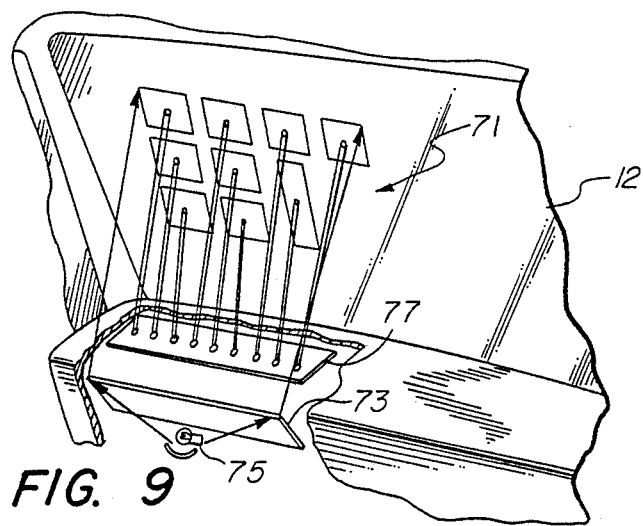
FIG. 9 is a perspective view of an alternate embodiment of a holographic control panel providing touch indicia.

FIG. 9 illustrates a simplified embodiment providing a touch indication on a holographic display 71 of the keyboard 60. A transmission hologram 73 located at or below the dash level and illuminated by a light source 75 provides a virtual image keyboard beyond the windshield 12 in a simplified form of display.

The embodiment of FIG. 9 employs a second hologram 77 selectively illuminatable by light tubes, e.g., fiberoptic tubes $F_1 \ldots F_n$ to focus a dot on the virtual image 71 of the keys 61 ... 69 and thumbwheel 68. The tubes $F_1 \ldots F_n$ are supplied with light sources activated in response to touching of the keys and thumbwheel according to the method previously discussed with respect to FIG. 4, i.e., by decoding touch outputs to activate respective light sources. The embodiment thus permits a convenient display to indicate which function or subfunction is being activated by the driver on the keyboard 60. A simplified "dot" touch indication may also be provided on an edge illuminated embodiment by focusing the light from selectively activated light emitting diodes onto an edge illuminated keyboard of background, such as $l_1$ in FIG. 3.

The holographic procedures for forming the holograms of the present invention can be found in known reference works such as "Optical Holography" by Collier et al., Academic Press, New York, N.Y. (1971). Additionally, the holographic image can be developed to be particularly sensitive to only a predetermined bandwidth of the illumination source. As is well-known in the holographic field, the hologram can be made to operate over a broader wavelength band giving increased brightness for a broadband source, but trading off increased coloration provides a lower photo-optic see-through capability.

The holographic layers $l_1 \ldots l_7$ are typically constructed to contain an image and or indicia in the form of a diffraction grating. As previously indicated, an appropriate light source can then be coupled to the lower edge of the layer through a fiber optic coupling to reconstruct the image. Alternatively, one could project light from light sources of different wavelengths or incident angles to avoid activating the diffraction grating of adjacent layers.

As can be appreciated, it is within the ordinary skill of this art to provide two or more separate diffraction gratings in the same common holographic layer that can be independently activated by different wavelengths or incident angles of illumination. Finally, where images or messages are contained within a holographic layer, then the physical envelope of the windshield should be taken into consideration during the construction of the hologram to compensate for any distortion, for example, the object source can be distorted to compensate for the effect of the window curvature, or the holographic layer can be physically defined in the same position that it will be mounted on the window to permit the development of the diffraction gratings to take into account the non-planar configuration.

The disclosed hologram display 11 can be relatively inexpensive in mass production with substantially little weight addition to the vehicle. It also does not occupy any substantial space in the interior of the vehicle. Finally, it contributes to the aesthetic design of the vehicle.

Various modifications to the above described invention may be readily apparent to those skilled in the optical and automotive fields in view of the above described generic concepts. Therefore, the scope of the present invention should be interpreted solely from the following claims.

I claim:

1. A display comprising:
   a windshield in front of a viewer's face;
   a control panel means responsive to the viewer's manual movements; and
   means including a hologram means applied to said windshield for displaying an indication of said manual movements in a line of sight through said windshield.

2. The display of claim 1 wherein said control panel means is responsive to said manual movements to activate control functions and wherein said hologram means includes a hologram displaying a background representation of a said control function and a hologram display indicating the state of said function.

3. The display of Claim 1 wherein said hologram means includes:
   a background hologram means for providing a plurality of illuminated areas corresponding to a plurality of parameters controllable on said control panel; and
   a plurality of hologram means, each disposed over one of said areas for indicating the state of a respective said parameter.

4. The display of claim 1 wherein said control panel includes a plurality of switches responsive to touch and to depression for controlling said control functions, and wherein said hologram means includes:
  a background hologram means for providing a plurality of illuminated areas corresponding to a plurality of control functions controllable by respective said switches; and
  a first hologram means disposed over a first of said areas for displaying an indication that said switch has been touched.

5. The display of claim 4 further including a second hologram means disposed over one of said areas for displaying an indication that a said switch has been depressed.

6. The display of claim 5 wherein said background hologram means, first hologram means and second hologram means each are formed in a respective hologram film layer.

7. The display of claim 1 wherein said control panel means produces a plurality of control signals and wherein said means for displaying further includes means responsive to said control signals for generating said indication on said hologram means.

8. The display of claim 7 wherein said hologram means comprises a first hologram for generating a virtual image background display, and a second hologram means for providing a plurality of selectively activated virtual dot images on said virtual image background.

9. The display of claim 7 further including a microprocessor means responsive to said control signals to assign different control functions to said control panel.

10. The display of claim 9 wherein said hologram means includes means for configuring a plurality of displays and wherein said microprocessor means selects one of said plurality of displays in accordance with the control functions assigned to said control panel.

11. The display of claim 10 in which the hologram means shows only the functions of a reconfigurable switch panel but not their state.

12. A display comprising:
a windshield in front of a viewer's face;
a control panel means responsive to the viewer's manual movements; and
means for displaying an indication of said manual movements in a line of sight through said windshield,
wherein said manual movements include a touch movement and an enable movement and wherein said control panel includes a switch means providing a touch indication and an enable indication and wherein said means for displaying is operative to display an indication that said switch means is being touched and is thereafter operative to display an indication that said switch means has been enabled.

13. A display comprising:
a windshield in front of a viewer's face;
a control panel means responsive to the viewer's hand movements; and
means for displaying an indication of said hand movements in a line of sight through said windshield.

* * * * *